Oct. 18, 1966   J. J. IHNACIK, JR   3,279,833
BALL JOINT AND SEAL ASSEMBLY
Filed March 20, 1964
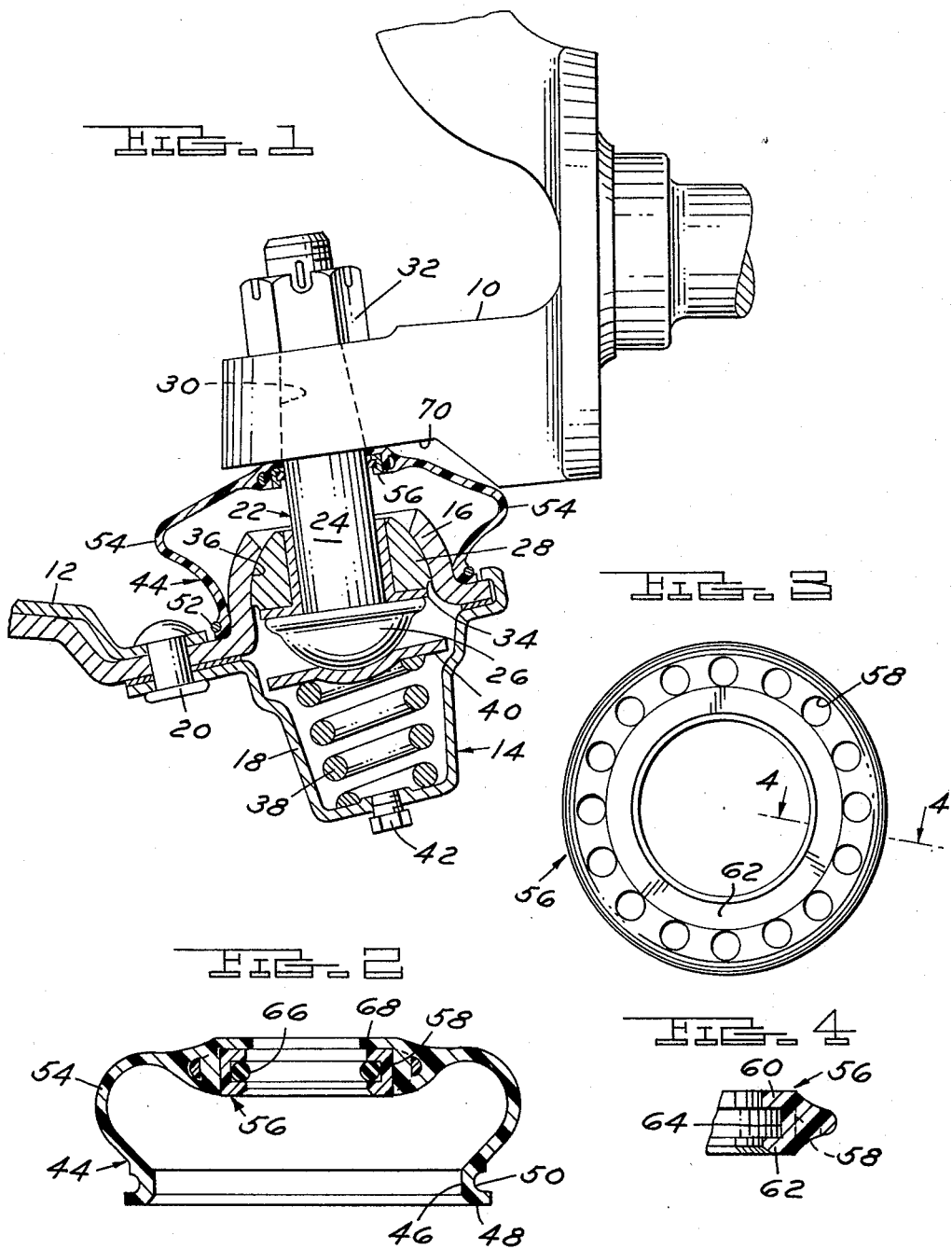
JOSEPH J. IHNACIK JR.
INVENTOR
John R. Faulkner
Clifford L. Sadler
ATTORNEYS

United States Patent Office 3,279,833
Patented Oct. 18, 1966

3,279,833
BALL JOINT AND SEAL ASSEMBLY
Joseph J. Ihnacik, Jr., Detroit, Mich., assignor to Ford Motor Company, Dearborn, Mich., a corporation of Delaware
Filed Mar. 20, 1964, Ser. No. 353,464
6 Claims. (Cl. 287—90)

The present invention relates generally to ball and socket type joints, and more particularly to a novel seal for such joints.

Ball and socket joints provide an articulated connection between two relatively movable members. It is common practice to provide joints of this type in vehicle suspension systems such as at the connection between the suspension arms and the wheel spindle. Ball joints are also used in the steering linkage.

A ball joint usually comprises a spherical or semi-spherical socket and a stud with a one- or two-piece spherical head that is seated in the socket. The joints are lubricated with grease to permit low friction movement. In order to retain the lubricant within the socket and prevent the entry of dirt that might damage the bearing surfaces, a boot type seal is usually provided. A boot seal is usually formed of a flexible material such as rubber in an annular shape with a small opening at one end and a large opening at the other. The small end is in sealed engagement with the stud while the large end is in sealed engagement with the socket.

In automotive suspension systems, it has become a practice to provide ball and socket joints that are lubricated with a grease of improved quality that will retain good lubricating characteristics for extended usage beyond the heretofore conventional 1000-mile servicing. In order to realize the advantages of a ball joint construction having such lubrication, superior means must be provided to retain the grease and to prevent its contamination.

In accordance with this need, it is an object of the present invention to provide a boot type seal for a ball joint having superior sealing characteristics.

Further objects and advantages of the present invention will be more fully comprehended from the following discussion and the accompanying drawings, in which:

FIGURE 1 is an elevational view, partly in section, of a portion of a vehicle suspension system having a ball joint seal constructed in accordance with this invention;

FIGURE 2 is an elevational view, in section, of the seal portion of the suspension assembly shown in FIGURE 1;

FIGURE 3 is a top plan view of the insert portion of the enlarged elevational view showing the seal of FIGURE 2; and FIGURE 4 is an elevational view taken along section lines 4—4 of the ferrule portion of FIGURE 3.

Referring now to the drawing for a complete understanding of the invention, FIGURE 1 discloses a portion of a vehicle suspension that includes a wheel spindle 10 and a suspension arm 12. A ball joint assembly 14 rotatably and tiltably connects the spindle 10 with the arm 12. The ball joint assembly 14 includes upper and lower socket portions 16 and 18 that are secured to the end of the arm 12 by rivets 20.

A stud member 22 has a shank portion 24 with a hemispherical head 26 at one end that is positioned within the socket portions 16, 18. An annular bearing member 28 cooperates with the head 26 to form the ball portion of the joint. The shank 24 of the stud 22 is fitted in a tapered hole 30 in the wheel spindle 10 and secured by a nut 32.

A hat-shaped washer 34 is interposed between the annular bearing member 28 and the head portion 26. The washer 34 forms a bearing to accommodate steering movement of the spindle 10 and stud 22.

A hemispherical internal bearing surface 36 is provided by the socket portion 16 that is slidably engaged by the annular bearing member 28 to accommodate tilting motion of the joint 14 during jounce and rebound suspension movement.

A coil spring 38 and a washer 40 preload the joint 14 and keep the bearing surfaces in their proper position. A threaded plug 42 is provided in the end of the socket portion 18 to permit the ball joint assembly 14 to be charged with a lubricant.

A flexible boot seal 44 surrounds the socket portion 16 and stud 22. It is the purpose of this seal to retain lubricant within the ball joint assembly 14 and to prevent the entry of water, dirt and other contaminants.

The seal 44 is an annular member having a large opening 46 at one end that is surrounded by an enlarged lip 48. The lip 48 is provided with a groove 50 that receives a spring ring 52. The ring 52 secures the large opening 46 in sealed engagement against the exterior of the upper socket part 16. The body portion of the seal 44 bulges outwardly at 54 so that material is available for flexing during jounce and rebound movement of the suspension arm 12.

Means are provided to place the upper end of the seal 44 in sealed engagement with the shank 24 of the stud 22 and the adjacent portion of the spindle 10.

Such sealing means comprise a premolded plastic insert 56 having the configuration disclosed in FIGURES 3 and 4. The insert 56 is provided with a circumferential series of retaining holes 58. When the insert 56 is placed in the mold that produces the body portion of the seal 44, rubber flows and is molded about and through the openings 58 to secure it in position upon curing.

Insert 56 has an inwardly facing channel portion that is defined by upper and lower flanges 60 and 62. The lower edge of the flange 62 is chamfered to facilitate assembly on the shank 24 of the stud 22.

The channel 64 formed by the flanges 60 and 62 contains a resilient O-ring 66. As disclosed in FIGURE 1, the O-ring 66 is in sealed engagement with the shank 24. The rubber body portion of the seal 44 is molded to have an inwardly extending radial flange 68. Flange 68 is positioned with its exposed side adjacent to the adjoining face 70 of the spindle 10. The edge of flange 68 extends inwardly beyond the flanges 60 and 62 of the insert 56 and to a point generally equal to the inside diameter of the O-ring 66.

The O-ring 66 is confined in the channel 64 to provide a predetermined diametral squeezing for positive sealing against the ball stud shank 24 while allowing rotary motion during steering movement for the spindle 10. This unique seal provides superior characteristics in preventing both the escape of lubricant from the ball joint assembly 14 and the entry of contaminating dirt.

Modifications and alterations of this invention may occur to those skilled in the art that will come within the scope and spirit of the following claims.

I claim:
1. A suspension arm, a wheel spindle, a ball joint assembly having a socket part secured to said arm and a stud part secured to said spindle, said spindle having a flat surface generally perpendicular to the axis of said stud and facing said assembly, a boot seal having a resilient body portion with a large open end secured about said socket part and a small end, a relatively hard circular member joined to said small end, said member having a pair of axially spaced apart inwardly directed annular ridges, an annular resilient O-ring seal positioned between said ridges and slidably engaging said stud, said small end having a radial flange position adjacent said member and against said flat surface, said radial flange extending inwardly beyond said annular ridges, said member having a circumferential perforated portion embedded in said small end.

2. A first element, a second element, and a ball joint assembly, said assembly having a socket part secured to said first element and a stud part secured to said second element to provide an articulated connection between said elements, said second element having a flat surface generally perpendicular to the axis of said stud and facing said assembly, a boot seal having a resilient body portion with a large open end secured about said socket part and a small end, a relatively hard circular member joined to said small end, said member having a pair of axially spaced apart inwardly directed annular ridges, an annular resilient seal positioned between said ridges and slidably engaging said stud, said member having a circumferential perforated portion embedded in said small end.

3. A first element, a second element, and a ball joint assembly, said assembly having a socket part secured to said first element and a stud part secured to said second element to provide an articulated connection between said elements, said second element having a flat surface generally perpendicular to the axis of said stud and facing said assembly, a boot seal having a resilient body portion with a large open end secured about said socket part and a small end, a relatively hard circular member joined to said small end, said member having a pair of axially spaced apart inwardly directed annular ridges, an annular resilient seal positioned between said ridges and slidably engaging said stud, said small end having a radial flange positioned adjacent said member and against said flat surface, said radial flange extending inwardly beyond said annular ridges.

4. A first element, a second element, and a ball joint assembly, said assembly having a socket part secured to said first element and a stud part secured to said second element to provide an articulated connection between said elements, said second element having a flat surface generally perpendicular to the axis of said stud and facing said assembly, a boot seal having a resilient body portion with a large open end secured about said socket part and a small end, a relatively hard circular member joined to said small end, said member having a pair of axially spaced apart inwardly directed annular ridges, an annular resilient seal positioned between said ridges and slidably engaging said stud.

5. A suspension arm, a wheel spindle, a ball joint assembly having a socket part secured to said arm and a stud part secured to said spindle, said spindle having a flat surface generally perpendicular to the axis of said stud and facing said assembly, a boot seal having a resilient body portion with a large open end secured about said socket part and a small end, a relatively hard circular member joined to said small end, said member having an inwardly open channel shaped portion and a circumferential perforated portion radially outwardly of said channel shaped portion, an annular resilient seal positioned within said channel shaped portion and slidably engaging said stud, said perforated portion being embedded in said small end.

6. First and second elements, means connecting said elements for universal movement therebetween, said means including a ball joint assembly having a socket part secured to said first element and a stud part secured to said second element, a boot seal having a body portion with a large open end secured about said socket part and a small end, said small end having a pair of relatively hard axially spaced annular apart inwardly directed radial flanges, an annular resilient O-ring seal positioned between said flanges and slidably engaging said stud.

References Cited by the Examiner

UNITED STATES PATENTS

| | | |
|---|---|---|
| 3,164,389 | 1/1965 | Thomas. |
| 3,175,834 | 3/1965 | Wallace et al. |

FOREIGN PATENTS

| | | |
|---|---|---|
| 1,157,216 | 12/1957 | France. |
| 1,342,187 | 9/1963 | France. |

CARL W. TOMLIN, *Primary Examiner.*

A. V. KUNDRAT, *Assistant Examiner.*